United States Patent
Hsiao

(10) Patent No.: US 11,323,674 B2
(45) Date of Patent: May 3, 2022

(54) PROJECTION DEVICE, PROJECTION SYSTEM AND IMAGE CORRECTION METHOD

(71) Applicant: Coretronic Corporation, Hsin-Chu (TW)

(72) Inventor: Pei-Chi Hsiao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 413 days.

(21) Appl. No.: 16/524,141

(22) Filed: Jul. 28, 2019

(65) Prior Publication Data

US 2020/0045275 A1 Feb. 6, 2020

(30) Foreign Application Priority Data

Jul. 31, 2018 (CN) .......................... 201810856321.X

(51) Int. Cl.
*H04N 9/31* (2006.01)
*G06T 3/00* (2006.01)
(Continued)

(52) U.S. Cl.
CPC ......... *H04N 9/3185* (2013.01); *G06T 3/0037* (2013.01); *G06T 5/006* (2013.01);
(Continued)

(58) Field of Classification Search
CPC .. H04N 9/3185; H04N 9/3194; H04N 9/3179; H04N 9/31; G06T 3/0037;
(Continued)

(56) References Cited

U.S. PATENT DOCUMENTS 7,001,023 B2   2/2006   Lee et al.
7,036,940 B2   5/2006   Matsuda et al.
(Continued)

FOREIGN PATENT DOCUMENTS

CN   102129680   7/2011
CN   102170544   8/2011
(Continued)

OTHER PUBLICATIONS

"Search Report of Europe Counterpart Application", dated Jan. 3, 2020, p. 1-p. 10.
(Continued)

*Primary Examiner* — Chan S Park
*Assistant Examiner* — Daniel C Chang
(74) *Attorney, Agent, or Firm* — JCIPRNET

(57) ABSTRACT

A projection device including a processor circuit is provided. The processor circuit generates multiple warped feature points according to multiple first feature points and multiple second feature points. The processor circuit transforms a first mapping table into a second mapping table according to the warped feature points. The projection device projects a correction pattern to a projection screen. The correction pattern includes the first feature points. The processor circuit receives an image of the correction pattern projected to the projection screen that is captured by a 3D image capturing device, so as to obtain coordinate positions of the second feature points. The processor circuit calculates a viewer position according to the coordinate positions of the second feature points. The processor circuit generates an antiwarp image according to an input image and the second mapping table. The projection device projects the antiwarp image to the projection screen.

6 Claims, 11 Drawing Sheets

(51) Int. Cl.
    *G06T 7/73*     (2017.01)
    *G06T 5/00*     (2006.01)
    *G03B 21/56*     (2006.01)

(52) U.S. Cl.
    CPC ............... *G06T 7/73* (2017.01); *G03B 21/56* (2013.01); *G06T 2200/04* (2013.01)

(58) Field of Classification Search
    CPC ....... G06T 5/006; G06T 7/73; G06T 2200/04; G03B 21/56
    See application file for complete search history.

(56) References Cited

U.S. PATENT DOCUMENTS

| | | | |
|---|---|---|---|
| 2004/0257540 A1 | 12/2004 | Roy et al. | |
| 2013/0027599 A1 | 1/2013 | Hung et al. | |
| 2015/0254819 A1* | 9/2015 | Hara | G06T 5/006 345/647 |
| 2018/0007329 A1* | 1/2018 | Tanaka | G09G 3/001 |
| 2019/0246083 A1* | 8/2019 | Tripathi | H04N 9/3185 |

FOREIGN PATENT DOCUMENTS

| | | |
|---|---|---|
| CN | 103019643 | 4/2013 |
| CN | 105554486 | 5/2016 |
| KR | 101713875 | 3/2017 |
| TW | I592020 | 7/2017 |
| WO | 0147285 | 6/2001 |

OTHER PUBLICATIONS

Richard Hartley et al., "Multiple View Geometry in Computer Vision," Journal of Cambridge University Press (Second Edition), Jan. 16, 2003, pp. 1-673.

Ramesh Raskar et al., "Multi-Projector Displays Using Camera-Based Registration," In Conference on Visualization, Oct. 1999, pp. 1-8.

Jin Zhou et al., "Multi-Projector Display with Continuous Self-Calibration," In Proceedings of PROCAMS '08 Proceedings of the 5th ACM/IEEE International Workshop on Projector camera systems, Aug. 2008, pp. 1-7.

Fred L. Bookstein, "Principal warps: thin-plate splines and the decomposition of deformations," Journal of IEEE Transactions on Pattern Analysis and Machine Intelligence, vol. 11, Issue 6, Jun. 1989, pp. 567-585.

Thaddeus Beier et al., "Feature-Based Image Metamorphosis," Journal of ACM SIGGRAPH Computer Graphics, vol. 26, Issue 2, Jul. 1992, pp. 35-42.

Scott Schaefer et al., "Image Deformation Using Moving Least Squares," In Proceeding of SIGGRAPH '06 ACM SIGGRAPH 2006 Papers, Jul. 2006, pp. 1-8.

G. Falcao, "Projector-Camera Calibration Toolbox," Retrieved on Jul. 10, 2018, Available at: http://code.google.com/p/procamcalib.

Daniel Moreno et al., "Simple, Accurate, and Robust Projector-Camera Calibration," Journal of 2012 Second International Conference on 3D Imaging, Modeling, Processing, Visualization & Transmission, Oct. 2012, pp. 1-9.

Zhengyou Zhang, "A Flexible New Technique for Camera Calibration," Journal of IEEE Transactions on Pattern Analysis and Machine Intelligence, vol. 22, Issue 11, Nov. 2000, pp. 1-22.

Oliver Bimber et al., "Embedded Entertainment with Smart Projectors," Journal of Computer, vol. 38, Issue 1, Jan. 2005, pp. 48-55.

"Office Action of China Counterpart Application", dated Feb. 5, 2021, p. 1-p. 8.

* cited by examiner

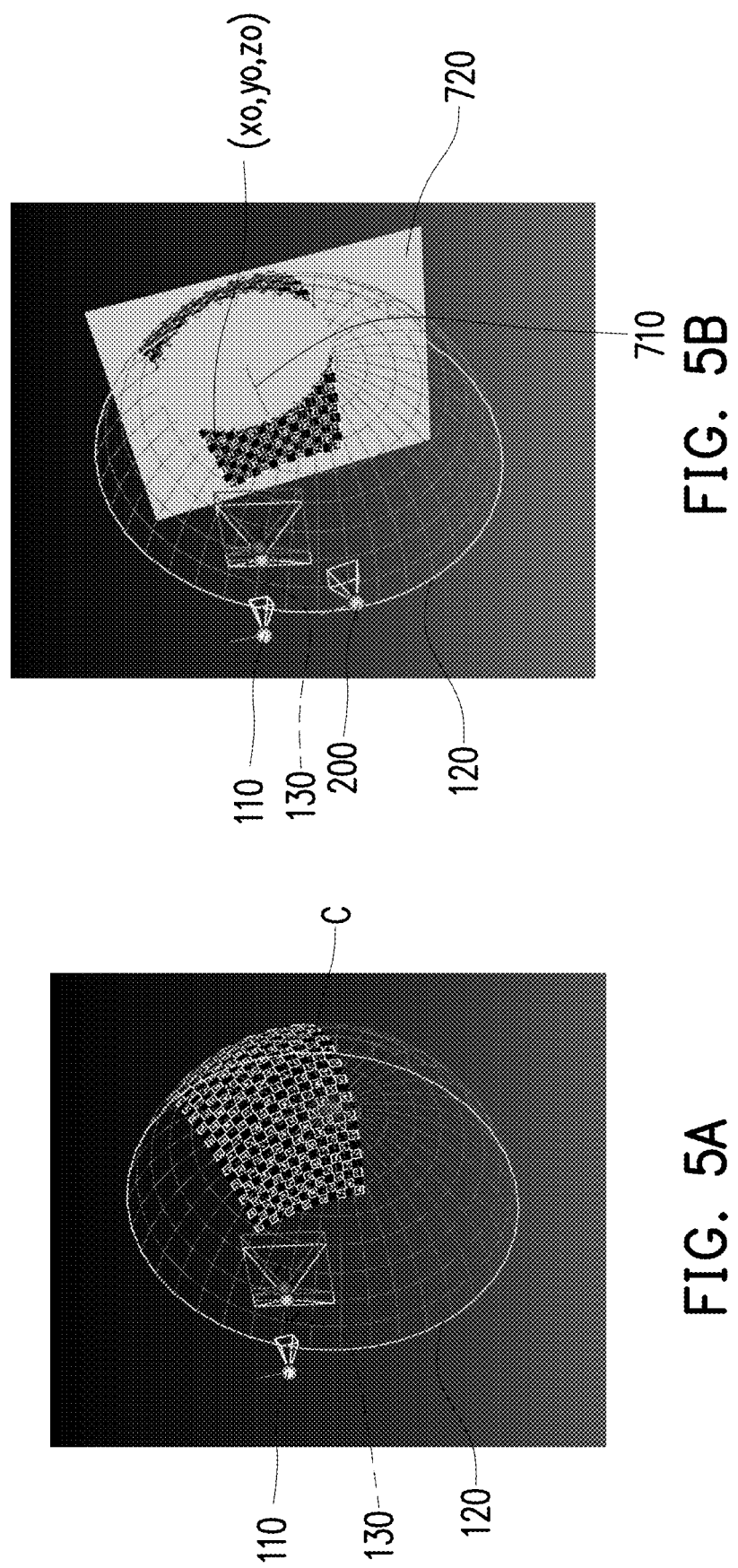

PROJECTION DEVICE, PROJECTION SYSTEM AND IMAGE CORRECTION METHOD

CROSS-REFERENCE TO RELATED APPLICATION

This application claims the priority benefit of China application serial no. 201810856321.X, filed on Jul. 31, 2018. The entirety of the above-mentioned patent application is hereby incorporated by reference herein and made a part of this specification.

BACKGROUND OF THE INVENTION

Field of the Invention

The invention relates to a projection device, a projection system and an image correction method, and particularly relates to a projection device applied to a curved projection screen, a projection system and an image correction method.

Description of Related Art

Projectors are commonly used in home entertainment and seminar applications, and in recent years, projectors are also used in virtual reality and light carving projection. Any irregularly shaped surface may be used as a screen of projection, which becomes a new way of media art presentation. Basically, the projector must be placed in a manner that a center of an optical axis of the projector is perpendicular to a projection surface, so that the projected images will not be warped. However, this limits a placing position of the projector, and a viewer's viewing angle is also limited. In order to change the placing position of the projector, a reflector may be added in internal of the projector, or an image pre-deformation mechanism is added by using an image processing chip, and such pre-deformation mechanism generally only has trapezoidal correction, and it is assumed that a projected surface is planar. When the projected surface is an arbitrarily shaped curved surface, for example, when a wall surface is uneven to cause slight sags and crests or when it is a curved screen, in order to avoid image warp and distortion of the projected image, it is necessary to pre-deform the image according to the surfaces of different geometric structures.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projection device, a projection system and an image correction method, and a viewer may view undistorted and warp-free images from a projection screen.

Other objects and advantages of the invention may be further illustrated by the technical features broadly embodied and described as follows.

In order to achieve one or a portion of or all of the objects or other objects, an embodiment of the invention provides a projection device including a processor circuit. The processor circuit generates a plurality of warped feature points according to a plurality of first feature points and a plurality of second feature points. The processor circuit transforms a first mapping table into a second mapping table according to the warped feature points. The projection device projects a correction pattern to a projection screen. The correction pattern includes the first feature points. The processor circuit is configured to receive an image of the correction pattern projected to the projection screen that is captured by a three-dimensional image capturing device, so as to obtain coordinate positions of the second feature points. The processor circuit calculates a viewer position according to the coordinate positions of the second feature points. The processor circuit generates an antiwarp image according to an input image and the second mapping table. The projection device projects the antiwarp image to the projection screen.

In order to achieve one or a portion of or all of the objects or other objects, an embodiment of the invention provides an image correction method. The image correction method is adapted to a projection device for projecting an antiwarp image to a projection screen. The image correction method includes: generating a plurality of warped feature points according to a plurality of first feature points and a plurality of second feature points, where the projection device projects a correction pattern to the projection screen, and the correction pattern includes the first feature points; capturing an image of the correction pattern projected to the projection screen by using a three-dimensional image capturing device, so as to obtain coordinate positions of the second feature points; transforming a first mapping table to a second mapping table according to the warped feature points; and generating an antiwarp image according to an input image and the second mapping table, and projecting the antiwarp image to the projection screen.

In order to achieve one or a portion of or all of the objects or other objects, another embodiment of the invention provides a projection system. The projection system is adapted to project images to a projection screen, and the projection system includes a projection device and a three-dimensional image capturing device. The projection device projects a correction pattern to the projection screen. The projection device generates a plurality of warped feature points according to a plurality of first feature points and a plurality of second feature points. The projection device transforms a first mapping table into a second mapping table according to the warped feature points. The correction pattern includes the first feature points. The three-dimensional image capturing device captures an image of the correction pattern projected to the projection screen, so as to obtain coordinate positions of the second feature points. The projection device calculates a viewer position according to the coordinate positions of the second feature points. The projection device generates an antiwarp image according to an input image and the second mapping table. The projection device projects the antiwarp image to the projection screen.

Based on the above description, the embodiments of the invention have at least one of the following advantages or effects. The projection device projects the antiwarp image to the projection screen such that the viewer may view undistorted images from the projection screen.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a schematic diagram of a projection system according to another embodiment of the invention.

FIG. 5B is a schematic diagram of calculating a viewer position by the projection system of the embodiment of FIG. 5A.

DESCRIPTION OF EMBODIMENTS

Figure 1A:
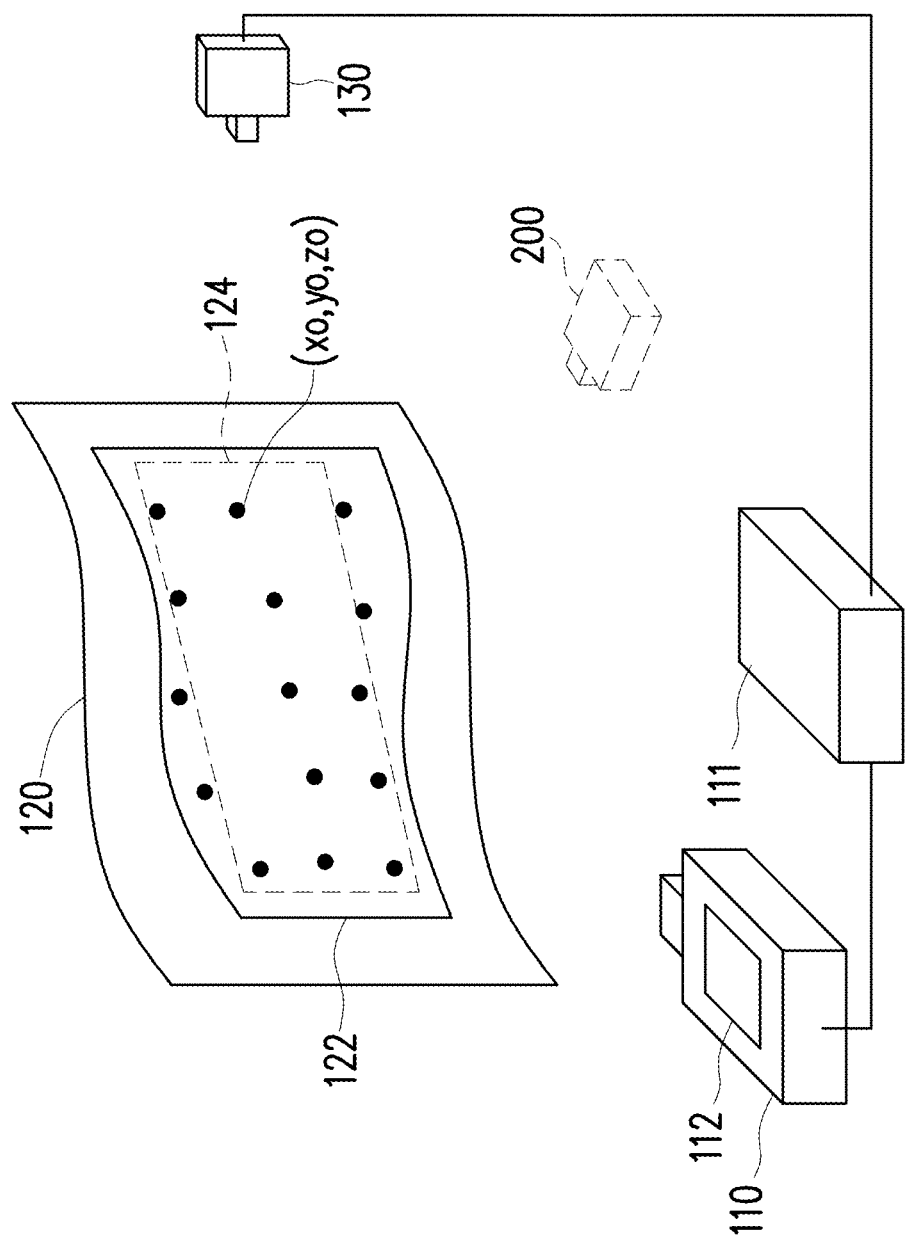
FIG. 1A is a schematic diagram of a projection system according to an embodiment of the invention.

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Image correction performed by a projector in response to different projection surfaces is collectively referred to as geometry correction. When a relative position between a projection screen and the projector is changed, and when a geometric shape of the projection screen is changed, recalibration of the projector is required to project a prewarp image, such that the image presented on the projection screen has no warp. When the screen is a plane, a projected image presented on the screen is a trapezoid or a quadrilateral satisfying the perspective transformation, and a homography transformation relationship may be calculated by using four corresponding control points, so as to generate the prewarp image. When the geometric shape of the screen may be described by exact mathematical equations, for example, a spherical surface, a biconcave surface, a cylinder surface, a plane, etc., spatial coordinates of the geometric surface may be fully grasped as long as the mathematical equations describing the geometric shape of the projection screen are found. By simulating an optical path emitted by each pixel of the projector and projected to the surface of the screen through a three-dimensional simulation method, the prewarp image may be back-calculated. When the screen is an arbitrary curved surface, for example, sags and crests caused by uneven wall surface, a wall corner, a curtain, all of the aforementioned geometric surfaces, in order to generate the prewarp image, the geometric surface of the screen has to be accurately learned. In the existing technique, geometric correction of arbitrary curved surface requires prior camera correction or installation of special optical sensing components, which increases complexity of a geometry correction process and waste of system erection and installation time.

In an exemplary embodiment of the invention, a process of the geometric correction of the projection device is simple, and the erection and installation time of the projection system is reduced. The projection device projects an antiwarp image to a curved projection screen, and a viewer may view a warp-free image from the curved projection screen. At least one embodiment is provided below with reference of figured for further description. The antiwarp means to prevent the image warping, so as to let n user see an undistorted image.

Figure 1C:
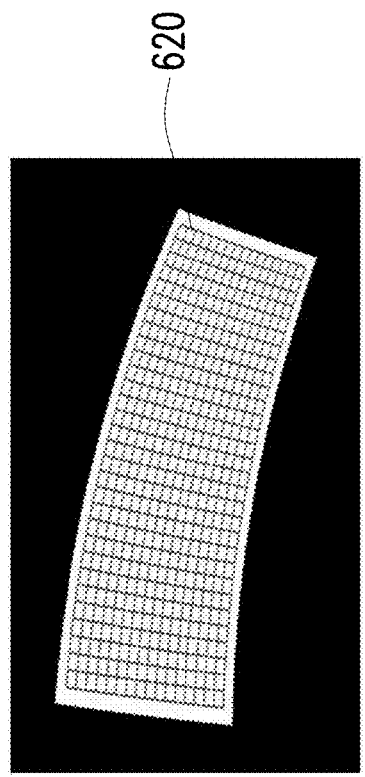
FIG. 1B and FIG. 1C are schematic diagrams of an input image and an antiwarp image of the projection system of FIG. 1A.
Figure 1B:
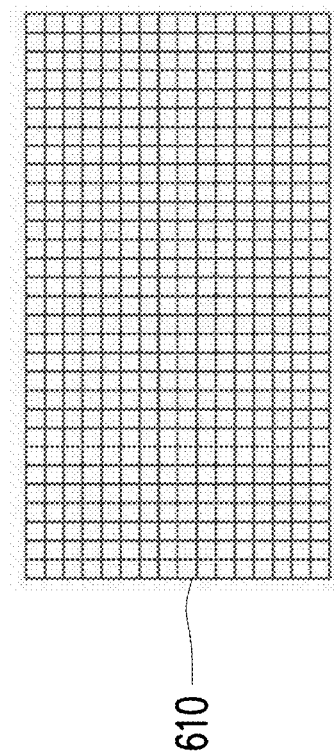

FIG. 1A is a schematic diagram of a projection system according to an embodiment of the invention. FIG. 1B and FIG. 1C are schematic diagrams of an input image and an antiwarp image of the projection system of FIG. 1A. The projection system 100 of the embodiment includes a projection device 110, a curved projection screen 120 and a 3D image capturing device 130. The projection device 110 includes a processor circuit 112 configured to execute image correction to generate an antiwarp mapping table W (a second mapping table). Moreover, the projection device 110 may also include other components used for implementing an image projecting function such as an optical component, a circuit component, a mechanism component, etc. The projection device 110, for example a projector, may receive an input image 610 from a host system 111 (e.g. a personal computer, a laptop or a smartphone, etc.), and the processor circuit 112 converts the received input image 610 into an antiwarp image 620 according to the antiwarp mapping table W. Then, the projection device 110 projects the antiwarp image 620 to the curved projection screen 120. Therefore, at a viewer position 200, a viewer (not shown) may view a warp-free and undistorted projected image on the curved projection screen 120.

In the embodiment, a referential number 122 represents a projection range of the projection device 110 on the curved projection screen 120. A referential number 124 represents a projection range of the projection device 110 on the curved projection screen 120 after image correction. On the curved projection screen 120, the projection range 124 after the image correction is smaller than the projection range 122 before the image correction. The curved projection screen 120, for example, includes surfaces such as a plane, a partial plane and partial curved surface, a curved surface, a concave surface, a spherical surface or an arbitrary curved surface, etc. The arbitrary surface means that the geometric surface of the arbitrary curved surface that is partially viewed is changed continuously and satisfies the Euclidean space characteristics. The geometric surface of the arbitrary curved surface may also be referred to as manifolds, and an overall topological structure thereof is flexible, and the topological structure mapped from a plane to the arbitrary curved surface remains unchanged. In the embodiment, the projection device 110 deforms the input image 610 based on the aforementioned characteristics, and when the deformed image (i.e. the antiwarp image 620) is projected to the curved projection screen 120, a warp-free and undistorted projection correction result may be seen from the viewer position 200.

Figure 1D:
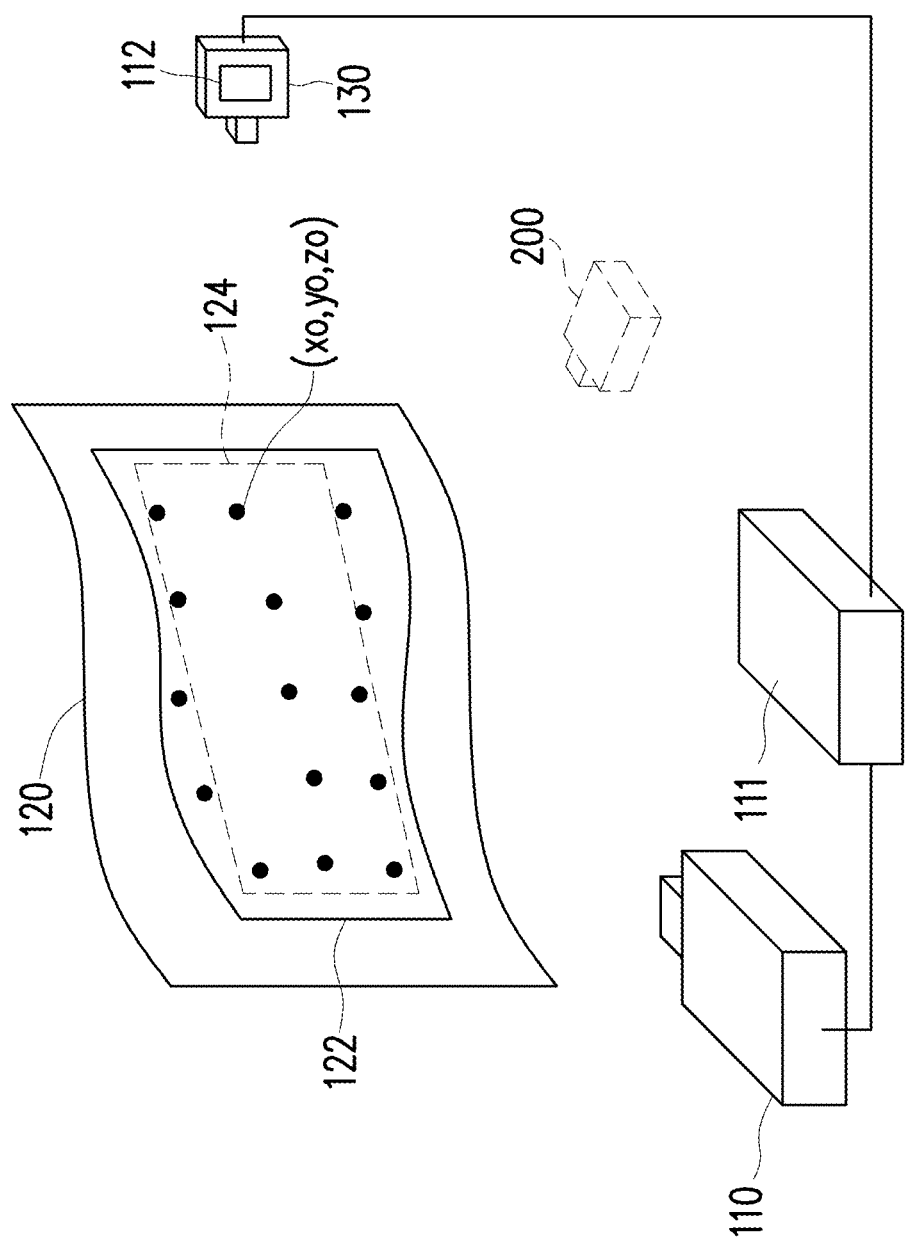
FIG. 1D is a schematic diagram of a projection system according to another embodiment of the invention.

FIG. 1D is a schematic diagram of a projection system according to another embodiment of the invention. A difference between the projection system 100 of the embodiment and the projection system of FIG. 1A is that the processor circuit 112 of the embodiment is disposed in the 3D image capturing device 130, for example a stereo camera, and is configured to execute image correction to generate the antiwarp mapping table W (the second mapping table), and transmit the same to the projection device 110, where the projection device 110 has a storage device (for example, a memory) to store the antiwarp mapping table W. The projection device 110 may receive an input image from the host system 111, and the projection device 110 converts the received input image into the antiwarp image 620 according to the antiwarp mapping table W. Then, the projection device 110 projects the antiwarp image 620 to the curved projection screen 120. Therefore, the viewer at the viewer position 200 may view a warp-free and undistorted projected image on the curved projection screen 120.

Figure 2C:
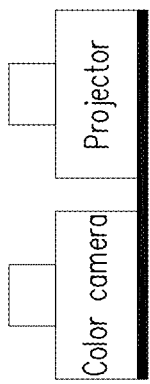
FIG. 2A, FIG. 2B and FIG. 2C are schematic diagrams of different combinations of a 3D image capturing device of the embodiment of FIG. 1A.
Figure 2B:
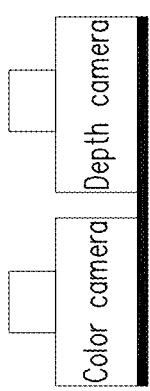
Figure 2A:
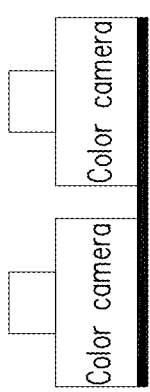

FIG. 2A, FIG. 2B and FIG. 2C are schematic diagrams of different combinations of the 3D image capturing device of the embodiment of FIG. 1A. Referring to FIG. 1A, FIG. 2A to FIG. 2C, in the embodiment of FIG. 2A, the 3D image capturing device 130 may be a combination including two color cameras. In the embodiment of FIG. 2B, the 3D image capturing device 130 may be a combination including one color camera and one depth camera. In the embodiment of FIG. 2C, the 3D image capturing device 130 may be a combination including one color camera and one projector. Based on the above three camera combinations, the 3D image capturing device 130 may execute a 3D image capturing function to obtain spatial coordinate positions of the feature points (the second feature points) on the curved projection screen 120. Enough instructions and recommendations for the method of executing the 3D image capturing function by using the aforementioned three camera combinations may be learned from ordinary knowledge of the related technical field.

How to produce the antiwarp mapping table W (the second mapping table) is described below.

Figure 3B:
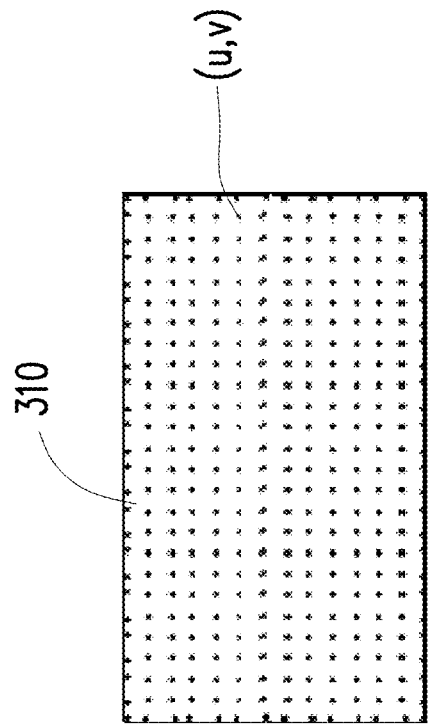
FIG. 3A and FIG. 3B are schematic diagrams of a correction pattern and first feature points captured from the correction pattern according to an embodiment of the invention.
Figure 3A:
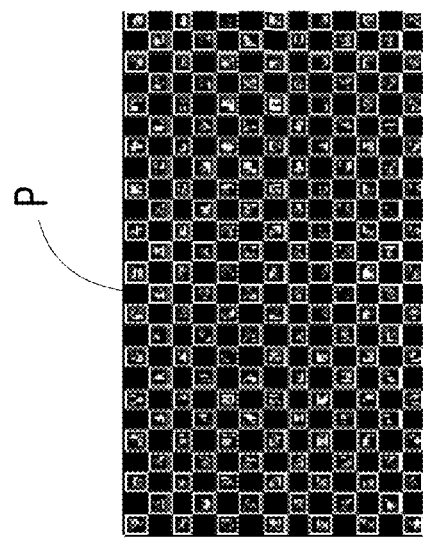
Figure 3D:
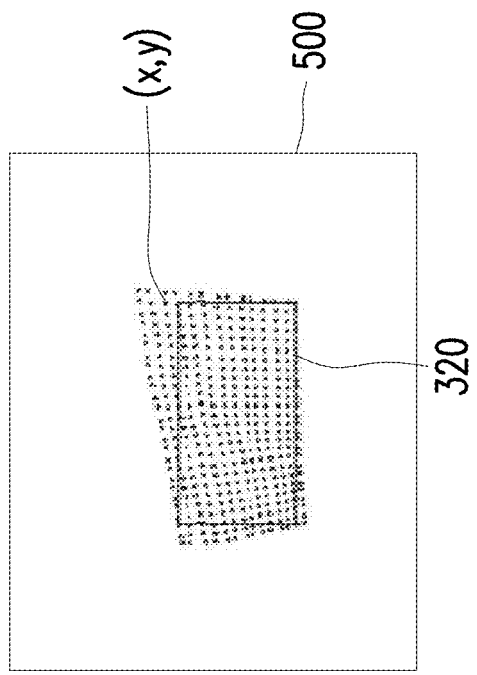
FIG. 3D is a schematic diagram of third feature points on a virtual plane according to an embodiment of the invention.
Figure 3C:
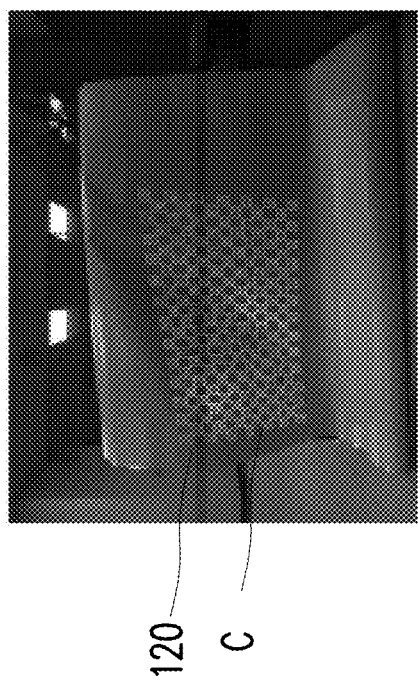
FIG. 3C is a schematic diagram of the correction pattern of FIG. 3A projected to a curved projection screen.

FIG. 3A and FIG. 3B are schematic diagrams of a correction pattern and first feature points captured from the correction pattern according to an embodiment of the invention. FIG. 3C is a schematic diagram of the correction pattern of FIG. 3A projected to the curved projection screen. FIG. 3D is a schematic diagram of third feature points on a virtual plane according to an embodiment of the invention. Referring to FIG. 1A, FIG. 3A to FIG. 3D, in the embodiment, the projection device 110 may receive a correction pattern P from external (for example, the host system 111) or generate the same from internal, where a resolution of the correction pattern P is the same to a projection resolution of the image to be projected by the projection device 110 (which is referred to as a projection resolution of the projection device 110). The processor circuit 112 obtains a plurality of first feature points (u,v) from the correction pattern P, which belong to a projector coordinate system, as shown in FIG. 3B. During the correction process, a placing position and a rotation angle of the projection device 110 are not limited as long as a projection direction of the projection device 110 is to face the curved projection screen 120. The projection device 110 projects the correction pattern P to the curved projection screen 120 including an arbitrary curved surface. Due to undulation of the surface of the curved projection screen 120 and a projection angle of the projection device 110, the projected image may have a warp deformation, as shown in FIG. 3C. In the embodiment, the 3D image capturing device 130 is disposed at a position other than the viewer position 200, and is configured to capture an image of a warped correction pattern C, so as to obtain coordinate positions of a plurality of second feature points, for example, the second feature points $(x_o, y_o, z_o)$ shown in FIG. 1A. It should be noted that in FIG. 1D, the processor circuit 112 is disposed in the 3D image capturing device 130, and the 3D image capturing device 130 may receive a first correction pattern P from external (for example, the host system 111) or generate the same from internal, where a resolution of the first correction pattern P is the same to a projection resolution of the image to be projected by the projection device 110. The 3D image capturing device 130 transmits the first correction pattern P to the projection device 110. The projection device 110 projects the first correction pattern P to the curved projection screen 120.

In the embodiment, due to undulation of the surface of the curved projection screen 120 and the projection angle of the projection device 110, the projected image may have a warp deformation, so that the second feature points $(x_o, y_o, z_o)$ on the correction pattern C are a plurality of feature points distributed in space, and by using the 3D image capturing device 130, 3D coordinate positions of the second feature points $(x_o, y_o, z_o)$ actually distributed in the space may be obtained. In the embodiment, the processor circuit 112 receives information provided by the 3D image capturing device 130, and calculates the viewer position 200 according to the coordinate positions of the second feature points $(x_o, y_o, z_o)$. Then, the processor circuit 112 calculates a plurality of third feature points (x,y) on a virtual plane 500 at the viewer position 200 according to the coordinate positions of the second feature points $(x_o, y_o, z_o)$ and the viewer position 200, as shown in FIG. 3D. The virtual plane 500 is located at the viewer position 200, and the third feature points (x,y) are distributed on the virtual plane 500. A calculation result that the third feature points (x,y) are distributed on the virtual plane 500 as shown in FIG. 3D is equivalent to a situation of setting a virtual camera at the viewer position 200 of FIG. 1A, and using the virtual camera to capture the image of the warped correction pattern C, so as to obtain the distribution of the third feature points (x,y). In the embodiment of the FIG. 1A, none image captured device is disposed at the viewer position 200.

In the embodiment, the processor circuit 112 obtains a plurality of first feature points (u,v) from the correction pattern P, which belong to a projector coordinate system. The feature points are all different, and each of the feature points has a different pattern. The processor circuit 112 obtains a largest circumscribed quadrilateral 310 according to the arrangement of the first feature points (u,v). On the other hand, the processor circuit 112 obtains a largest inscribed quadrilateral 320 according to the arrangement of the third feature points (x,y), as shown in FIG. 3D.

Then, the processor circuit 112 generates a similar matrix S according to the largest circumscribed quadrilateral 310 and the largest inscribed quadrilateral 320. The largest circumscribed quadrilateral 310 and the largest inscribed quadrilateral 320 include a vertical and horizontal scaling relationship ($s_w, s_h$) and a translation relationship ($t_w, t_h$). According to fourth vertex coordinates of the largest circumscribed quadrilateral 310 and the largest inscribed quadrilateral 320, four unknowns $s_w$, $s_h$, $t_w$, $t_h$ of of the similar matrix S are obtained. Therefore, the similar matrix S may transform the second feature points (x,y) of a camera coordinate system into feature points (s,t) of the projector coordinate system, as shown by a following equation:

$$\begin{bmatrix} s \\ t \\ 1 \end{bmatrix} = \begin{bmatrix} s_w & 0 & t_w \\ 0 & s_h & t_h \\ 0 & 0 & 1 \end{bmatrix} \begin{bmatrix} x \\ y \\ 1 \end{bmatrix}$$

Where, the 3×3 matrix is the similar matrix S, the feature points (s,t) represents warped feature points, and such warp is caused by a projection angel between the curved projection screen 120 and the projection device 110. The first feature points (u,v) represent the corrected feature points expected by the viewer 200.

In the embodiment, the processor circuit 112 transforms a first mapping table T into the antiwarp mapping table W (the second mapping table) according to the warped feature points (s,t). In the embodiment, the projection device 110 receives the first mapping table T from external (the host system 111). In other embodiments, as shown in FIG. 1D, the 3D image capturing device 130 receives the first mapping table T from the host system 111. In the embodiment, the first mapping table T is a two-dimensional (2D) matrix that is the same with the projection resolution of the projection device 110, where each value represents a position to be mapped by each pixel, and the first mapping table T represents coordinate positions aligned with an original image (the image provided by the host system 111). In the embodiment, the processor circuit 112 takes the first mapping table T as a 2D image, and places the feature points (s,t) on the first mapping table T, and pulls the warped feature points (s,t) towards the first feature points (u,v) by using an image deformation method, so as to perform a deformation operation to the first mapping table T to generate the antiwarp mapping table W. The antiwarp mapping table W represents a process of correcting the warped feature points, so that it is referred to as "antiwarp". In the embodiment, the image deformation method may be implemented by steps of any image deformation method of the related technical field, which is not limited by the invention. Enough instructions and recommendations for detailed steps and implementation method thereof may be learned from ordinary knowledge of the related technical field.

Figure 4A:
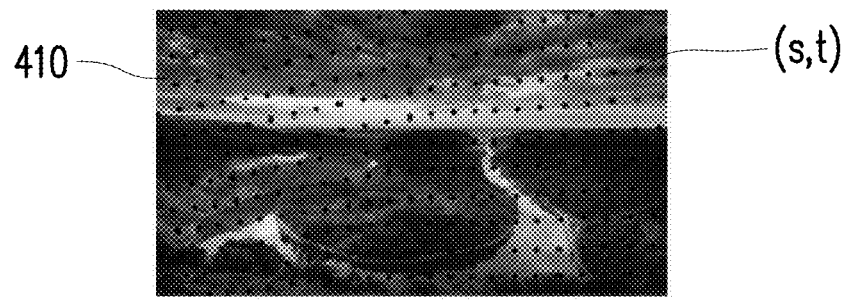
FIG. 4A, FIG. 4B and FIG. 4C are schematic diagrams of projecting an antiwarp image to the curved projection screen by the projection device.
Figure 4B:
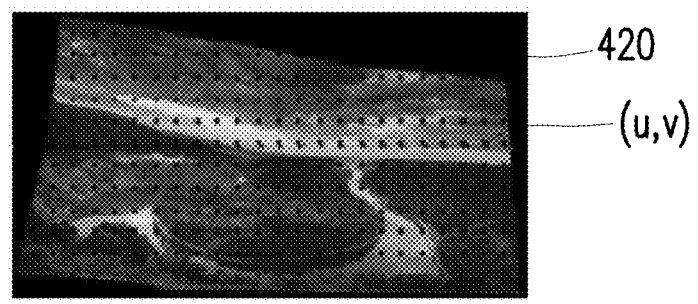
Figure 4C:
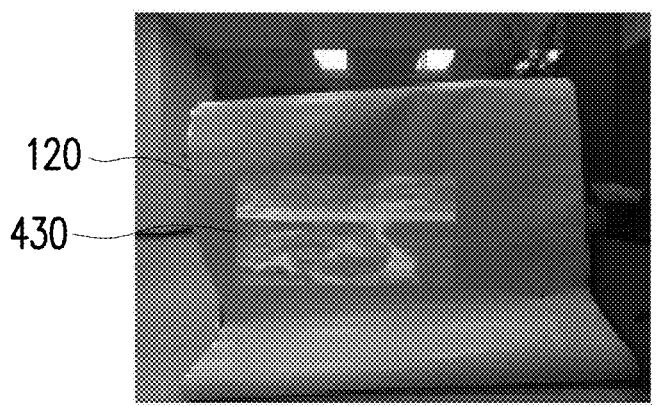

FIG. 4A, FIG. 4B and FIG. 4C are schematic diagrams of projecting the antiwarp image to the curved projection screen by the projection device. Referring to FIG. 1A and FIG. 4A to FIG. 4C, in the embodiment, the projection device 110 receives an input image 410, and after correction, it is equivalent that the warped feature points (s,t) are distributed on the input image 410. It should be noted that the warped feature points (s,t) are not actually displayed on the input image 410, and the feature points (s,t) shown in FIG. 4A are only for easy understanding of those skilled in the art. In the embodiment, the processor circuit 112 of the projection device 110 generates an antiwarp image 420 according to the antiwarp mapping table W, and after the correction, it is equivalent that the antiwarp image 420 is distributed with the first feature points (u,v). The first feature points (u,v) represent the corrected feature points expected by the viewer. It should be noted that the first feature points (u,v) are not actually displayed on the antiwarp image 420, and the first feature points (u,v) shown in FIG. 4B are only for easy understanding of those skilled in the art. The projection device 110 projects the antiwarp image 420 to the curved projection screen 120. From the angle of the viewer position 200, a warp-free and undistorted projection correction result (i.e. a corrected image 430) is viewed.

In the embodiment, the processor circuit 112, for example, includes a Central Processing Unit (CPU), a microprocessor, a Digital Signal Processor (DSP), a programmable controller, a Programmable Logic Device (PLD) or other similar device or a combination of the above devices, which is not limited by the invention. In the embodiment, the 3D image capturing device 130, for example, includes a camera, a mobile phone camera, or a photo camera, etc., configured to capture 3D images, which is not limited by the invention. In the embodiment, the storage device is, for example, a movable Random Access memory (RAM), a Read-Only Memory (ROM), a flash memory or a similar device or a combination of the above devices. The host system 111 is, for example, an electronic device such as a personal computer, a tablet computer or a smart phone, etc., which is used for providing an image source of the image.

How to calculate the viewer position and a plurality of the third feature points on the virtual plane at the viewer position is introduced below.

Figures 5C, 5D:
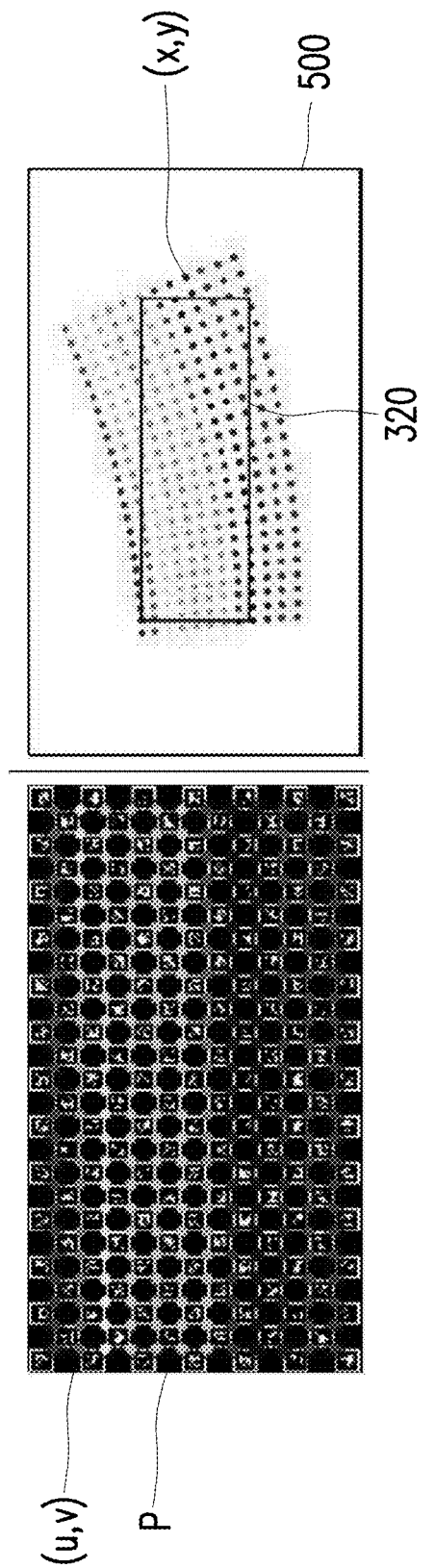
FIG. 5C is a schematic diagram of a correction pattern and the first feature points thereon.
FIG. 5D is a schematic diagram of third feature points on the virtual plane calculated by the projection system of the embodiment of FIG. 5A.

FIG. 5A is a schematic diagram of a projection system according to another embodiment of the invention. FIG. 5B is a schematic diagram of calculating a viewer position by the projection system of the embodiment of FIG. 5A. FIG. 5C is a schematic diagram of a correction pattern and the first feature points thereon. FIG. 5D is a schematic diagram of the third feature points on the virtual plane calculated by the projection system of the embodiment of FIG. 5A. Referring to FIG. 5A to FIG. 5D, the projection device 110 receives the correction pattern P, and projects the correction pattern P to the curved projection screen 120. In the embodiment, the curved projection screen 120 is, for example, a ball screen. In the embodiment, the first feature points (u,v) are not actually displayed on the correction pattern P, and the feature points (u,v) shown in FIG. 5C are only for easy understanding of those skilled in the art. The correction pattern P may be a design pattern of recognizable feature points, and is not limited to the use of a certain specific correction pattern.

Then, the 3D image capturing device 130 captures an image of the curved projection screen 120, and the 3D image capturing device 130 is, for example, a combination of two color cameras as shown in FIG. 2A. A position of the 3D image capturing device 130 is taken as a coordinate origin of a world coordinate system, and coordinate positions of the captured second feature points may be represented by ($x_o$, $y_o$, $z_o$). The second feature points ($x_o$, $y_o$, $z_o$) are distributed on a geometric surface of the curved projection screen 120, as that shown in FIG. 5B.

In the embodiment, the projection device 110 receives the information provided by the 3D image capturing device 130, and performs Principal Component Analysis (PCA) on the second feature points ($x_o$, $y_o$, $z_o$), and uses an approximate plane equation to describe the second feature points ($x_o$, $y_o$, $z_o$). The specific method is to perform eigen decomposition on the covariance matrix of the second feature points $(x_o,y_o,z_o)$, so as to obtain three sets of eigenvectors perpendicular to each other. The eigenvectors corresponding to two maximum eigenvalues represent the plane 720 for best describing the second feature points, and the eigenvector corresponding to the minimum eigenvalue represents a normal vector 710 of the plane 720. The normal vector 710 is represented by (a,b,c), and the plane 720 may be represented by a plane equation $ax+by+cz+d=0$. In the embodiment, it is assumed that the plane 720 passes through a known center point $(x_m,y_m,z_m)$ of the second feature points $(x_o,y_o,z_o)$. By substituting the center point $(x_m,y_m,z_m)$ into the plane equation $ax+by+cz+d=0$, the unknown number d may be obtained. Based on the above calculation method, it is learned that the normal vector 710 is (a,b,c) and the plane 720 is $ax+by+cz+d=0$.

In the embodiment, it is assumed that the normal vector 710 is parallel to a virtual camera optical axis center (the viewer position 200), and an orientation of the virtual camera in the world coordinate system may be determined by using the plane 720. Then, the second feature points $(x_o,y_o,z_o)$ are projected to the virtual camera to obtain the third feature points (x,y). The third feature points (x,y) may be determined according to following equations (1) and (2):

$$\begin{bmatrix} x_C \\ y_C \\ z_C \\ 1 \end{bmatrix} = \begin{bmatrix} R & -RT \\ 0 & 1 \end{bmatrix} \begin{bmatrix} x_O \\ y_O \\ z_O \\ 1 \end{bmatrix} \quad (1)$$

$$\begin{bmatrix} x_\omega \\ y_\omega \\ \omega \end{bmatrix} = K \begin{bmatrix} x_C \\ y_C \\ z_C \end{bmatrix}, \quad x = x_\omega/\omega, \; y = y_\omega/\omega \quad (2)$$

In the equation (1), $(x_o,y_o,z_o)$ are coordinates of the second feature points in the world coordinate system, R is a transformation matrix that converts the second feature points from the world coordinate system to the camera coordinate system, T is a translation matrix that converts the second feature points from the world coordinate system to the camera coordinate system, and $(x_c,y_c,z_c)$ are coordinates of the second feature points in camera coordinate system. Therefore, based on the equation (1), the second feature points $(x_o,y_o,z_o)$ may be converted from the world coordinate system to the camera coordinate system to obtain the second feature points $(x_c,y_c,z_c)$ of the camera coordinate system. In the embodiment, the translation matrix T represents a position of the virtual camera in the world coordinate system, for example, the translation matrix T represents a position at a distance v in front of the plane 720, where v is a custom constant or deduced from a human eye perspective. In the embodiment, the transformation matrix R may be calculated by using Rodrigues rotating equation, and enough instructions and recommendations for the calculation method thereof may be learned from ordinary knowledge of the related technical field.

In the equation (2), K is an intrinsic 3×3 projection matrix of the virtual camera, and parameters thereof may be customized by the user, and w is a normalization parameter. Therefore, according to the equation (2), the second feature points $(x_c,y_c,z_c)$ of the camera coordinate system may be converted into the third feature points (x,y) on the virtual plane 500, as shown in FIG. 5D. The virtual plane 500 is located at the position of the virtual camera (the viewer position 200).

Figure 6:
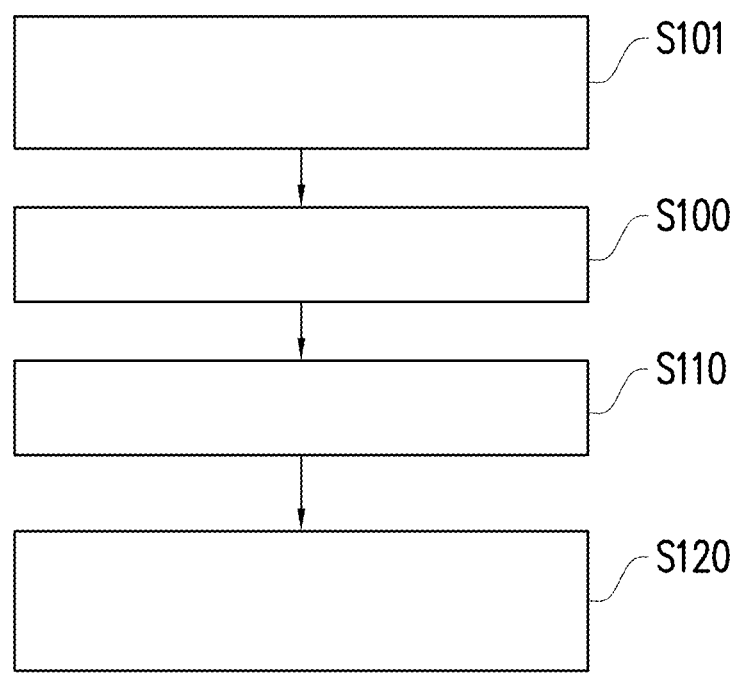
FIG. 6 is a schematic diagram of an image correction method according to an embodiment of the invention.

FIG. 6 is a schematic diagram of an image correction method according to an embodiment of the invention. Referring to FIG. 1A and FIG. 6, the image correction method of FIG. 6 is, for example, adapted to the projection system 100 of FIG. 1A. The projection device 110 projects an antiwarp image 620 to the curved projection screen 120. In step S101, the 3D image capturing device 130 is applied to capture an image of the correction pattern P projected to the curved projection screen 120, so as to obtain coordinate positions of the second feature points $(x_o,y_o,z_o)$. In step S100, the processor circuit 112 generates a plurality of warped feature points (s,t) according to the first feature points (u,v) and the second feature points $(x_o,y_o,z_o)$. I step S110, the processor circuit 112 transforms the first mapping table T to the second mapping table W according to the warped feature points (s,t). In step S120, the projection device 110 generates the antiwarp image 620 according to the input image 610 and the second mapping table W, and projects the antiwarp image 620 to the curved projection screen 120. Therefore, the warp-free and undistorted corrected image may be viewed from the viewer position 200. Moreover, enough instructions and recommendations for the image correction method of the embodiment may be learned from descriptions of the embodiments of FIG. 1A to FIG. 5D.

Figure 7:
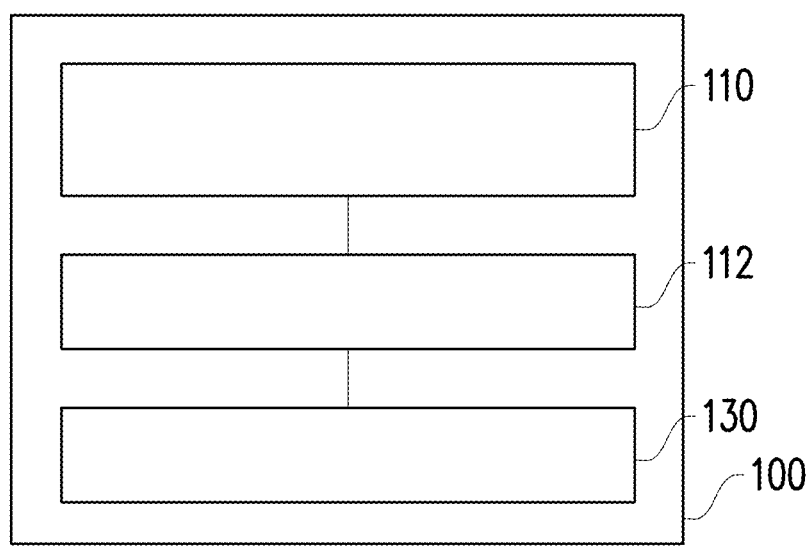
FIG. 7 is a schematic diagram of a projection system according to an embodiment of the invention.

FIG. 7 is a schematic diagram of a projection system according to an embodiment of the invention. The projection system 100 of the embodiment includes the projection device 110 (for example, a projector), the processor circuit 112 and the 3D image capturing device 130. The projection device 110 is connected to the processor circuit 112, the processor circuit 112 is connected to the 3D image capturing device 130, and the 3D image capturing device 130 is connected to the projection device 110. It should be noted that the connection relationship between every two devices is implemented by signal transmission, where the signals are transmitted between the devices in a wired or wireless manner. The processor circuit 112 may be physically disposed in the projection device 110 or the processor circuit 112 may be physically disposed in the 3D image capturing device 130. In other embodiments, the projection system 100 may further include the host system 111 (shown in FIG. 1A), and the processor circuit 112 may also be disposed in the host system 111. Configuration position of the processor circuit 112 is not limited by the invention, and the processor circuit 112 may also be a single device. The projection device 110 and the 3D image capturing device 130 may be integrated and packaged into one projection device for implementation, or may be implemented as independent devices, which is not limited by the invention.

In summary, the embodiments of the invention have at least one of following advantages or effects. In the embodiments of the invention, besides the projection device, the projection system uses the 3D image capturing device to capture the correction pattern projected by the projection device, so as to obtain the feature points. By applying the image correction method, the projection device may generate the prewarp image, and the geometry correction process is simple and fast. The projection device may calculate the viewer position according to the feature points obtained by the 3D image capturing device. After the correction is completed, the projection device may generate the antiwarp mapping table. The antiwarp mapping table is a geometric correction for the curved projection screen relative to the projection device. The projection device uses the antiwarp mapping table to generate the antiwarp image and projects the same on the curved projection screen, such that the image viewed at the viewer position is the warp-free and undistorted correction result.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising:
   a processor circuit,
   wherein the projection device is configured to project a correction pattern to a projection screen, the correction pattern comprises first feature points, and wherein the processor circuit is configured to:
   receive an image of the correction pattern projected to the projection screen, the image is captured by a three-dimensional image capturing device, so as to obtain coordinate positions of second feature points;
   calculate a viewer position according to the coordinate positions of the second feature points;
   calculate third feature points on a virtual plane at the viewer position according to the coordinate positions of the second feature points and the viewer position;
   obtain a largest circumscribed quadrilateral according to an arrangement of the first feature points;
   obtain a largest inscribed quadrilateral according to an arrangement of the third feature points;
   generate a similar matrix according to the largest circumscribed quadrilateral and the largest inscribed quadrilateral;
   convert the third feature points into warped feature points according to the similar matrix; and
   transform a first mapping table into a second mapping table according to the warped feature points,
   the processor circuit is configured to generate an antiwarp image according to an input image and the second mapping table, and the projection device is configured to project the antiwarp image to the projection screen.

2. The projection device of claim 1, wherein the three-dimensional image capturing device is disposed at a position other than the viewer position in front of the projection screen.

3. An image correction method, adapted to a projection device for projecting an antiwarp image to a projection screen, the image correction method comprising:
   projecting a correction pattern to the projection screen, wherein the correction pattern comprises the first feature points;
   capturing an image of the correction pattern projected to the projection screen by using a three-dimensional image capturing device, so as to obtain coordinate positions of second feature points;
   calculating a viewer position according to the coordinate positions of the second feature points;
   calculating third feature points on a virtual plane at the viewer position according to the coordinate positions of the second feature points and the viewer position;
   obtaining a largest circumscribed quadrilateral according to an arrangement of the first feature points;
   obtaining a largest inscribed quadrilateral according to an arrangement of the third feature points;
   generating a similar matrix according to the largest circumscribed quadrilateral and the largest inscribed quadrilateral;
   converting the third feature points into warped feature points according to the similar matrix;
   transforming a first mapping table to a second mapping table according to the warped feature points;
   generating an antiwarp image according to an input image and the second mapping table; and
   projecting the antiwarp image to the projection screen.

4. The image correction method of claim 3, further comprising:
   disposing the three-dimensional image capturing device at a position other than the viewer position in front of the projection screen.

5. A projection system, adapted to project an image to a projection screen, and comprising:
   a projection device, projecting a correction pattern to the projection screen, wherein the correction pattern comprises first feature points; and
   a three-dimensional image capturing device, capturing an image of the correction pattern projected to the projection screen, and transforming the image of the correction pattern to the projection device so as to obtain coordinate positions of second feature points,
   wherein the projection device is configured to:
   calculate a viewer position according to the coordinate positions of the second feature points;
   calculate third feature points on a virtual plane at the viewer position according to the coordinate positions of the second feature points and the viewer position;
   obtain a largest circumscribed quadrilateral according to an arrangement of the first feature points;

obtain a largest inscribed quadrilateral according to an arrangement of the third feature points;

generate a similar matrix according to the largest circumscribed quadrilateral and the largest inscribed quadrilateral;

convert the third feature points into warped feature points according to the similar matrix; and transform a first mapping table into a second mapping table according to the warped feature points, generate an antiwarp image according to an input image and the second mapping table, and the projection device is configured to project the antiwarp image to the projection screen.

6. The projection system of claim 5, wherein the three-dimensional image capturing device is disposed at a position other than the viewer position in front of the projection screen.

* * * * *